Dec. 9, 1952  L. C. LODGE  2,620,664
PYROMETER WITH STABLE RECTIFIED VOLTAGE
Filed Sept. 8, 1947  2 SHEETS—SHEET 1
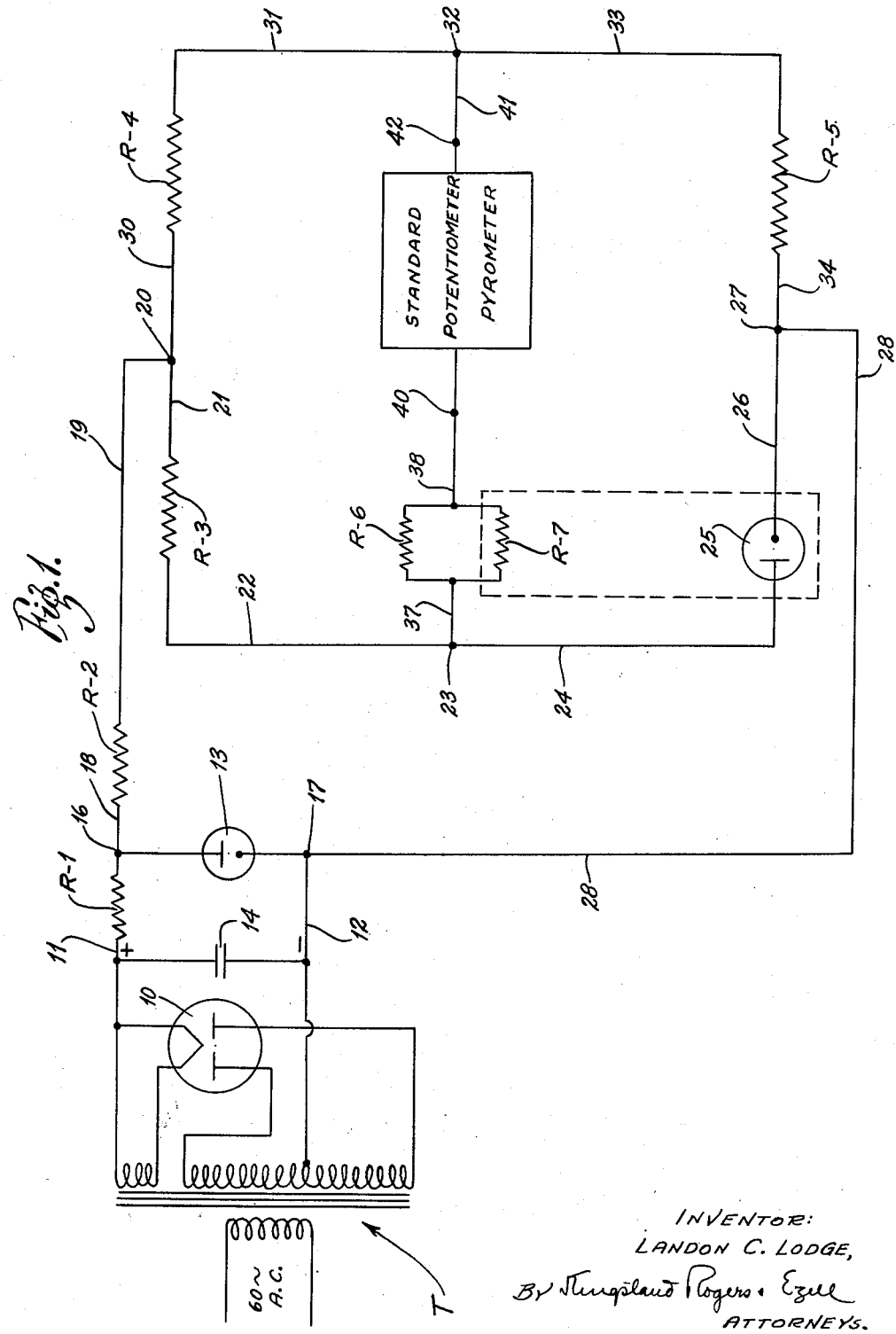
INVENTOR:
LANDON C. LODGE,
By Kingsland Rogers & Ezell
ATTORNEYS.

Dec. 9, 1952  L. C. LODGE  2,620,664
PYROMETER WITH STABLE RECTIFIED VOLTAGE
Filed Sept. 8, 1947  2 SHEETS—SHEET 2
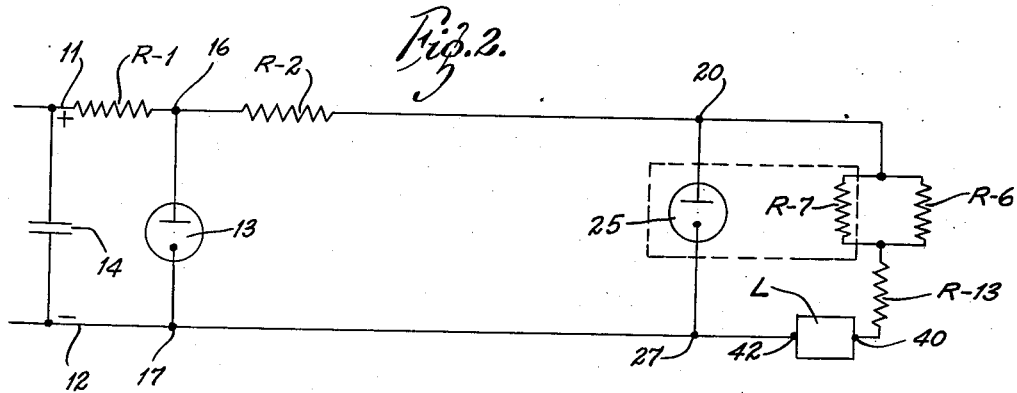
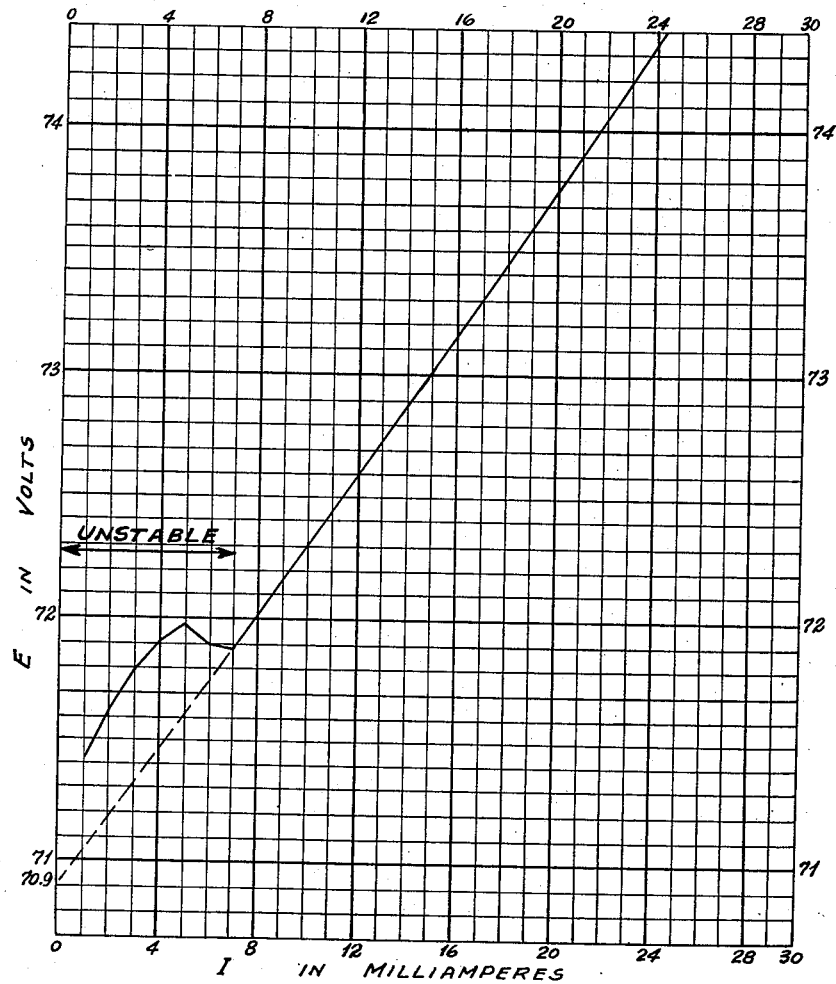
INVENTOR:
LANDON C. LODGE,
ATTORNEYS.

Patented Dec. 9, 1952

2,620,664

UNITED STATES PATENT OFFICE 2,620,664

PYROMETER WITH STABLE RECTIFIED VOLTAGE

Landon C. Lodge, St. Louis, Mo., assignor, by mesne assignments, to Minneapolis-Honeywell Regulator Company, Minneapolis, Minn., a corporation of Delaware Application September 8, 1947, Serial No. 772,801

8 Claims. (Cl. 73—360)

1

The present invention relates to a pyrometer with stable, rectified voltage.

It is an object of the invention to provide a pyrometer network combination including a very stable direct current power supply derived from an alternating current source, which source is subject to variation such as is found in conventional alternating current systems. In such systems, a nominally 115-volt source may actually vary from 100 volts to 130 volts.

A further object of the invention is to provide a pyrometer combination with a power source of the foregoing kind that will remain within a minimal percentage of its original value despite variations in ambient temperature of as much, for example, as 100° F. Specifically, it is an object of the invention to provide a pyrometer, such as a standard potentiometer pyrometer, having a rectified alternating current power source capable of supplying a direct current in the nature of .006 amperes to a resistive pyrometer network load and capable of maintaining this current within plus or minus 0.02 of one percent of its original value despite the variations aforesaid.

A particular object of the invention is to provide the power source aforesaid for a potentiometer type pyrometer that measures temperature by comparing the potential developed by a thermocouple or thermopile with a known fraction of a standard potential by means of a bridge circuit, wherein the standard and stable potential is derived from the power supply aforesaid.

Further objects of the invention include the provision of a pyrometer arrangement with such a very stable direct current power supply, that is relatively simple in construction and relatively inexpensive; so that it may be commercially substituted for the arrangements now in use, which largely consist of dry cells that are subject to discharge and variations of potential with temperature changes; and to supply in place of such dry cells a proper power source that is not subject to the discharge or temperature characteristics of the dry cells, but which may be used indefinitely. For example, the life of tubes used in the arrangement presently averages about 5000 hours.

In the drawings:

Fig. 1 is a diagrammatic view of the preferred form of the invention;

Fig. 2 is a diagrammatic view of another form; and

Fig. 3 is a chart indicating variation of potential with variations of current through a typical gaseous conduction discharge tube used in the apparatus.

In Fig. 1, a typical network has been shown with a transformer T illustrated as being supplied with 60 cycle alternating current power at 115 volts, but subject to variation from 95 volts to 135 volts. From the secondary of this transformer, lines are connected through a conventional full-wave rectifier 10 providing a positive power line 11 and a negative power line 12, that are connected across the usual condenser 14.

The potential difference between the two lines 11 and 12 may typically be in the nature of a minimum of 340 volts and a maximum of 480 volts for the suggested variation in primary potential.

A high ohmic resistor R–1 is in series with the line 11. A first VR tube 13 (i. e., gaseous conduction discharge or so-called "Voltage Regulator" tube) is connected at terminals 16 and 17 across the lines 11 and 12 after the resistor R–1.

From the terminal 16, a positive line 18 leads into another high ohmic resistor R–2. A line 19 leads from this resistor to the branch junction 20 of a bridge. From this junction 20 a first line 21 leads into a resistor R–3, from which a line 22 leads to a junction 23. From this junction, a line 24 leads into a second VR tubes 25. The other side of this tube leads by a line 26 to the other junction terminal 27 of the bridge. This junction is connected by a line 28 back to the junction 17 on the negative power line 12.

Returning to the upper junction 20 of the bridge, another line 30 leads to a resistor R–4, from which a line 31 leads to a junction 32. From this junction, another line 33 leads into a resistor R–5 that is connected by a line 34 into the lower junction 27 of the bridge.

The cross lines of the bridge lead from the terminal or junction 23 to the junction 32. From the junction 23, a line 37 leads to parallel temperature-compensating resistors R–6 and R–7, the other sides of which are connected by a line 38 to a load terminal 40.

Moving to the other junction 32 in the bridge, it will be seen that a line 41 is connected therefrom to a second load terminal 42.

The load terminals are connected oppositely to the usual terminals of a standard potentiometer pyrometer, to which the operating dry cell is conventionally connected. As this pyrometer may be one of the commercially available instruments, the circuits of which are well known, it is merely indicated in block diagram form herein. For illustration, but not limitation, reference may be made to a well known continuous balance potentiometer pyrometer having a slider contact movable across a resistor to obtain a potential balance between the potential developed by a thermocouple and a known fraction of the standard potential derived from the power network previously described.

In Fig. 2, there is a modification of the circuit which is adequate for some purposes but is subject to greater variation than the arrangement of Fig. 1.

The reference characters appearing in Fig. 2 correspond to those in Fig. 1. It will be seen there that the two power lines 11 and 12, which may derive their power from a similar transformer-rectifier-condenser combination to that of Fig. 1, have a first stage consisting of a resistor R-1 and a VR tube 13 that is the same as the first stage in Fig. 1. The second stage includes the resistor R-2 and the terminal points 20 and 27. However, instead of connecting the bridge network of Fig. 1 between the two junctions 20 and 27, the VR tube 25 is connected directly across these two terminals, and the load network is connected also across the two junctions 20 and 27. The load network includes again the resistance combination of R-6 and R-7 in parallel, and it also includes the series resistance R-13. The two load terminals 40 and 42 are as indicated, with the load generally indicated at L and consisting of the pyrometer previously mentioned.

Operation

The preferred form of the invention, illustrated in Fig. 1, will first be described. For illustrative values, it will be assumed that the initial power source is the conventional 60-cycle alternating current source that delivers a nominal 115 volts. Such sources are subject to variations, and the conventional allowance is to assume that these variations will change from a minimum of 95 volts to a maximum of 135 volts.

The transformer T, the rectifier 10 and the condenser 14 produce a pulsating, unidirectional current in the conventional manner. The potential across the condenser, the average value of which will vary almost directly with the R. M. S. value of the original alternating current source, is then applied to the network to remove the pulsations and to maintain a constant current through the resistive pyrometer network load, as will appear.

If the 60-cycle source is variable from 95 volts to 135 volts, the average direct potential across the condenser 14 may typically vary from 340 to 480 volts. The first circuit branch or stage across the condenser includes the resistor R-1 and the VR tube 13. The tube 13 may typically be of type OD-3 that develops approximately 150 volts when a current of from .005 to .030 amperes flows through it. With these values, the resistor R-1 may have 8550 ohms resistance, to give approximately 150 volts across the VR tube 13. The current through the tube may vary from approximately 4 ma. to 22 ma., while the voltage developed across the tube varies only a small percentage such as 8 percent of the variation of the applied potential across the condenser 14.

The voltage developed across the tube 13 is then applied to the second stage. This stage includes the resistor R-2 and the bridge network junctions 20 and 27. A voltage subject to much reduced variation is applied to the second stage. The potential drop through the resistor R-2 provides for a reduced voltage between the junctions 20 and 27.

Since the voltage between the junctions 20 and 27 of the bridge network is the voltage developed across the VR tube 13 less the drop in the resistor R-2, and since the resistor R-2 is of a relatively high value, as for example 4650 ohms, it will be seen that the variations in voltage applied across the two junctions 20 and 27 are very much reduced from the variations across the condenser 14. The resistor R-2 is of such value as to produce, when combined with the resistors of the bridge, a current of approximately 10 ma. through and a voltage drop of approximately 75 volts across the other VR tube 25. This second VR tube 25 is assumed to be of the type OA-3, which develops approximately 75 volts under a current variation of from 5 to 30 ma. through it. As is known in commercial VR tubes, this type is neon filled. It possesses a stability, to be described, that is greater than other VR tubes charged with different gases. This characteristic is made use of herein.

The compensating bridge circuit connected between the two terminals 20 and 27, as part of a second voltage regulating stage, is designed to maintain the current through the load constant within .02% despite variations in input voltage of as much as plus or minus 13%.

It will be seen that one leg of the bridge circuit consists of the second VR tube 25. A standard voltage regulator tube of this type, when maintained at a constant temperature, acts like an ideal battery and a pure constant resistance in series, subject to certain discovered limitations. As shown in Fig. 3, wherein the characteristics of such a voltage regulator tube are plotted, with I in milliamperes of current through the tube plotted against E in volts developed across the tube, it will be seen that in certain portions of the lower ranges of this curve there is great instability and very irregular variation of voltage with current. Actually, also, in this lower part of the curve, the voltage developed across the tube for a given current through the tube is different when the current is rising from that when the current is lowering. Beyond this very irregular part of the curve, stability is found, and consideration of this regular portion will show that it comprises a smooth, gently curving line, slightly concave to the left in Fig. 3. For a short distance, wherein the curve may be considered as a straight line, the voltage developed across the tube is equal to a constant voltage plus a voltage drop proportional to the current through the tube. That is to say, the voltage developed across the tube is the mathematical sum of a predetermined constant voltage that is relatively large, plus the product of the current through the tube expressed in amperes, and a constant resistance expressed in ohms, which product is relatively small. If the straight part or stable part of the curve of the individual tube charted in Fig. 3 were continued down until it reached zero current, it would intersect the voltage axis at a value of slightly under 71 volts, which value represents the constant voltage to which the IR drop through the tube is added to attain the voltage developed across the tube.

It has been further discovered that this relationship will hold strictly true with commercially available voltage regulator tubes only when the change in the current through the tube is held to a relatively small value, such as a value in the nature of 1 ma. The first voltage regulator tube 13 and the network up to the tube 25 hold the variation in voltage applied to the tube 25 within such limits, and hence within what can be considered as a straight portion of the stable part of the curve. As will appear, variations in ambient temperature also cause variations in the voltage across the voltage regulator tube, but the present arrangement has means to compensate for this.

Referring specifically to the curve of Fig. 3, it will be seen that the current through the tube 25 should be maintained between about .010 amperes and .011 amperes, which can be done by proper evaluation of the resistors R-2, R-3, R-4 and R-5.

The function of the bridge circuit is as follows: The resistances are so evaluated that R-3 is to R-4 as R-25 is to R-5, where R-25 represents the constant resistance of the tube 25 as expressed by the slope of the curve of Fig. 3 at the operating point. With such an arrangement, any changes of potential between the points 20 and 27 will cause equal changes in potential at points 23 and 32, and hence no change in the potential between the points 23 and 32.

R-1 may be made of any standard resistance wire, but, in order to maintain the stability necessary for pyrometry, R-2 must be made of a resistance wire having a negligible temperature coefficient of resistance, such as manganin.

As already stated, the operation of the tube 25 is affected by changes in temperature. The current through a voltage regulator tube is carried by ionized molecules of gas, and, if the temperature of the gas in the tube is increased, the molecular activity of the gas within it is increased. This lowers the apparent resistance of the tube, and a given current through it develops a lower voltage across it. After a short warm-up period, the temperature of the gas within the tube reaches a point that will always bear a fixed relation to the temperature of the air surrounding the tube, if the tube is protected from drafts and the temperature of the surrounding air does not change suddenly.

This temperature effect is compensated for in the present invention by the resistor R-7. This resistor is of a commercially available type, known as a negative temperature coefficient resistor, its resistance decreasing with rise in temperature. The resistor R-6, on the other hand, with which the resistor R-7 is electrically combined, is a resistance having negligible temperature coefficient of resistance, such as manganin, or it may be a wire having an appreciable positive temperature coefficient of resistance, such as any of the standard alloys in use today. The resistances of R-6 and R-7 must be so chosen that the resistance of the two in parallel will vary with temperature in such a way as to compensate for the change in potential developed by the tube 25 as a result of changes in its operating temperature, and so that the voltage drop they produce will provide the proper net voltage at the pyrometer terminals. Consequently, the resistor R-7 is located in close proximity to the tube 25 so as to be subjected to the same changes in temperature, and the tube 25 and resistor R-7 are protected from drafts and sudden temperature changes. By this means, it is possible to maintain a constant current through the load despite ambient temperature variations that are not abrupt, but that may amount to as much as 100° F. The values of R-6 and R-7 are chosen so that the total resistance of the circuit comprising these resistances and the load varies with change in temperature directly with the variations in voltage between points 23 and 32 caused by changes in temperature.

From the foregoing, it may be seen that, with an initial power source of alternating current subject to considerable variation in voltage, there will be a resulting direct current between the points 40 and 42 that is subject to only a small fraction of this variation. Indeed, the variation in voltage between the points 40 and 42 applied to a resistive load can be maintained within plus or minus .02% of its original value, despite the variations in temperature and applied voltage.

The pyrometer circuit is shown schematically, and merely is employed to typify one of the familiar pyrometer networks, which heretofore have been dependent upon dry cells.

With the arrangement of Fig. 2, the operation of the first stage including the resistor R-1 and the VR tube 13 is the same as that of the first stage in Fig. 1. Assuming R-2 to have a resistance of 4650 ohms, there will be developed across the junctions 20 and 27 of Fig. 2 approximately 72.3 volts, and the current through the tube 25 will be approximately 10 ma. The voltage developed across the tube 25 is then applied through the parallel resistances R-6 and R-7, and the resistance R-13, to the load junctions 40 and 42, which correspond to those of Fig. 1.

The resistance R-7 is one of negative temperature coefficient of resistance, and is similar to the resistor R-7 of Fig. 1, and is similarly protected from drafts and kept at the same temperature as that at the tube 25. For example, the resistor R-7 may have a resistance of 100 ohms at 25° C., and the resistor R-6 may have a resistance of 110 ohms and may be made as described in connection with Fig. 1. The resistance R-13 may have a resistance of 11,800 ohms. The resistance of the load may be varied from 180 ohms to 293 ohms in the typical pyrometer network.

These values are given merely as illustrations. It will be found that the variation in current through the load is held within very close limits, although not as close as are obtained by the arrangement of Fig. 1. The bare cascading of the two VR tubes cannot obtain the advantages that are present in Fig. 1 where the bridge network is used. However, it will be noted that the temperature compensation is provided in the cascading arrangement of Fig. 2, whereby it attains a very much greater stability than can be obtained otherwise. In this arrangement, as in the other one, the first stage holds the current variations across the second stage within narrow limits on the very staple portion of the tube graph, as shown in Fig. 3.

Thus, while the arrangement of Fig. 2 is not as desirable as that of Fig. 1, nevertheless it does attain a stability much greater than that heretofore obtained, and, for many purposes, it is adequate. It is suitable for pyrometry where the variations in the available power are within closer limits than those that may be accommodated by the arrangement of Fig. 1.

What is claimed is:

1. A pyrometer arrangement including a pyrometer having terminals for direct current input, a direct current power supply network, including a first stage having a voltage dropping resistor and a first gaseous conduction discharge tube in series, a second stage connected across the first tube, the second stage including a second voltage reducing resistance and a second gaseous conduction discharge tube in series, the second tube being subject to variations in potential developed thereacross with changes in temperature of the tube, a load circuit connected across the second tube including the pyrometer, and temperature-compensation means in the load circuit, the compensation means being subjected to temperature changes corresponding to those of the second tube, and being adapted to maintain constant potential at the pyrometer terminals despite changes in potential developed across the second tube due to temperature variations, the temperature-compensation means including a parallel-resistor hookup in the load circuit, one resistor of the hookup having resistance changes that increase with temperature variation correspondingly to the increase in potential developed across the second tube, and that resistance being subjected to the temperature changes corresponding to those at the second tube.

2. A pyrometer arrangement adapted to derive power from an alternating current source subject to wide variation, including a pyrometer, the pyrometer having terminals for a direct current input, a direct current power supply having two stages, the first stage comprising a gaseous conduction discharge tube and voltage dropping resistance in series for connection to a fluctuating unidirectional source of power rectified from an alternating current source, the second stage being connected across the first tube to have a potential corresponding to the potential developed across the first tube, the second stage including resistance and a second gaseous conduction discharge tube in series, a load circuit including the pyrometer and a compensating means, connected across the second tube, the compensating means being adapted to maintain constant potential at the pyrometer terminals despite variations in voltage developed across the second tube, caused by temperature changes at said second tube, the second tube having a characteristic curve of current through it against voltage developed across it wherein, at a low range of currents, voltage instability results, and at a higher range of currents stability results with a smooth curve wherein narrow ranges of current variation effectively correspond linearly with voltage developed, the first stage and second resistance being adapted to hold the current through the second tube within such narrow range on the stable part of said curve.

3. A pyrometer arrangement for connection with an alternating current source subject to potential variation, and a rectifier network having output terminals, the combination of a pyrometer apparatus having power input terminals, a first stage including a voltage dropping resistance and a first gaseous conduction discharge tube in series and for connection to said output terminals, a second stage connected across the first tube, and including resistance means and a second gaseous conduction discharge tube, the second stage comprising a bridge network having a first leg wherein a resistance and the second tube are connected in series, a second leg wherein resistances are connected in series across the first leg, and a load circuit including the pyrometer apparatus, connected from one leg to the other, the load circuit being thereby connected across the second tube, the bridge resistances and second tube being proportioned so that variations in potential applied to the bridge from the first stage will not produce changes in potential across the load, the second tube being subject to variations in potential developed across it resulting from changes in temperature of the tube, temperature-compensating means in the load circuit adapted to maintain potential applied to the load constant despite said changes in potential developed across the tube resulting from temperature changes.

4. A pyrometer arrangement for connection with an alternating current source subject to potential variation, and a rectifier network having output terminals, the combination of a pyrometer apparatus having power input terminals, a first stage including a voltage dropping resistance and a first gaseous conduction discharge tube in series and for connection to said output terminals, a second stage connected across the first tube, and including resistance means and a second gaseous conduction discharge tube, the second stage comprising a bridge network having a first leg wherein a resistance and the second tube are connected in series, a second leg wherein resistances are connected in series across the first leg, and a load circuit including the pyrometer apparatus, connected from one leg to the other, the load circuit being thereby connected across the second tube, the bridge resistances and second tube being proportioned so that variations in potential applied to the bridge from the first stage will not produce changes in potential across the load, the second tube being subject to variations in potential developed across it resulting from changes in temperature of the tube, temperature-compensating means in the load circuit adapted to maintain potential applied to the load constant despite said changes in potential developed across the tube resulting from temperature changes, the second tube being characterized in having the curve of voltage developed across it plotted against current through it display an irregular portion at low current ranges, followed by a smooth stable portion at higher current ranges, the stable portion being gently curved so that for narrow ranges of current variation the potential variation is effectively linear, the first stage and second resistances being adapted to hold the current variation through the second tube within such a narrow range.

5. A regulated direct current power supply network including a first stage having a voltage dropping resistor and a first gaseous conduction discharge tube in series, a second stage connected across the first tube, the second stage including a second voltage reducing resistance and a second gaseous conduction discharge tube in series, the second tube being subject to variations in potential developed thereacross with changes in temperature of the tube, an output circuit connected across the second tube including a pair of terminals adapted to have a load connected therebetween, and temperature-compensation means in the output circuit, the compensation means being subjected to temperature changes corresponding to those of the second tube, and being adapted to maintain constant potential at said terminals despite changes in potential developed across the second tube due to temperature variations, the temperature-compensation means including a parallel-resistor hookup in the output circuit, one resistor of the hookup having resistance changes that increase with temperature variation correspondingly to the increase in potential developed across the second tube, and that resistance being subjected to the temperature changes corresponding to those at the second tube.

6. A regulated direct current power supply having two stages, the first stage comprising a gaseous conduction discharge tube and voltage dropping resistance in series for connection to a fluctuating unidirectional source of power rectified from an alternating current source subject to wide voltage variation, the second stage being connected across the first tube to have a potential corresponding to the potential developed across the first tube, the second stage including resistance and a second gaseous conduction discharge tube in series, and an output circuit connected across the second tube including a pair of terminals adapted to have a load connected therebetween and including a compensating means, the compensating means being adapted to maintain constant potential at said terminals despite variations in voltage developed across the second tube, caused by temperature changes at said second tube, the second tube having a characteristic curve of current through it against voltage developed across it wherein, at a low range of currents, voltage instability results, and at a higher range of currents stability results with a smooth curve wherein narrow ranges of current variation effectively correspond linearly with voltage developed, the first stage and second resistance being adapted to hold the current through the second tube within such narrow range on the stable part of said curve.

7. A regulated direct current power supply having two stages, a rectifier network having output terminals and having input terminals adapted to be connected to a source of alternating current subject to voltage variation, a first stage including a voltage dropping resistance and a first gaseous conduction discharge tube in series and for connection to said output terminals, a second stage connected across the first tube, and including resistance means and a second gaseous conduction discharge tube, the second stage comprising a bridge network having a first leg wherein a resistance and the second tube are connected in series, a second leg wherein resistances are connected in series across the first leg, and an output circuit including a pair of terminals adapted to have a load connected therebetween, said output circuit being connected from one leg to the other, the output circuit being thereby connected across the second tube, the bridge resistances and second tube being proportioned so that variations in potential applied to the bridge from the first stage will not produce changes in potential across the last mentioned terminals, the second tube being subject to variations in potential developed across it resulting from changes in temperature of the tube, and temperature-compensating means in the output circuit adapted to maintain the potential applied to said last mentioned terminals constant despite said changes in potential developed across the tube resulting from temperature changes.

8. A regulated direct current power supply having two stages, a rectifier network having output terminals and having input terminals adapted to be connected to a source of alternating current subject to voltage variation, a first stage including a voltage dropping resistance and a first gaseous conduction discharge tube in series and for connection to said output terminals, a second stage connected across the first tube, and including resistance means and a second gaseous conduction discharge tube, the second stage comprising a bridge network having a first leg wherein a resistance and the second tube are connected in series, a second leg wherein resistances are connected in series across the first leg, and an output circuit including a pair of terminals adapted to have a load connected therebetween, said output circuit being connected from one leg to the other, the output circuit being thereby connected across the second tube, the bridge resistances and second tube being proportioned so that variations in potential applied to the bridge from the first stage will not produce changes in potential across the last mentioned terminals, the second tube being subject to variations in potential developed across it resulting from changes in temperature of the tube, and temperature-compensating means in the output circuit adapted to maintain the potential applied to said last mentioned terminals constant despite said changes in potential developed across the tube resulting from temperature changes, the second tube being characterized in having the curve of voltage developed across it plotted against current through it display an irregular portion at low current ranges, followed by a smooth stable portion at higher current ranges, the stable portion being gently curved so that for narrow ranges of current variation the potential variation is effectively linear, the first stage and second resistances being adapted to hold the current variation through the second tube within such a narrow range.

LANDON C. LODGE.

REFERENCES CITED

The following references are of record in the file of this patent:

UNITED STATES PATENTS

| Number | Name | Date |
|---|---|---|
| 2,329,841 | Keinath | Sept. 21, 1943 |
| 2,363,057 | Gaylord | Nov. 21, 1944 |
| 2,466,299 | Blok | Apr. 5, 1949 |

FOREIGN PATENTS

| Number | Country | Date |
|---|---|---|
| 684,473 | France | June 26, 1930 |